Patented Apr. 21, 1942

2,280,247

UNITED STATES PATENT OFFICE 2,280,247

WAXLIKE PRODUCT AND METHOD OF MAKING THE SAME FROM TALL OIL OR ROSIN AND FATTY ACIDS

Ralph H. McKee, New York, N. Y., and Helmer L. Blengsli, Old Greenwich, Conn.

No Drawing. Application February 25, 1939, Serial No. 258,570

7 Claims. (Cl. 260—97.5)

The present invention relates to wax-like condensation products of fatty acids and rosin acids, and, more particularly, to thermoplastic resinous condensation products of fatty acids and rosin acids of tall oil, and to a process of producing such wax-like condensation products on an industrial scale.

As is well known in the paper and pulp industry, when paper pulp is produced by the kraft or sulfate process and the black liquor is evaporated, a scum known as tall oil soap or sulfate soap separates from the black liquor upon cooling and floats upon its surface. The precise concentration to which the black liquor must be evaporated is governed by its viscosity and alkalinity, and those skilled in the art know at what specific gravity the heating of each separate batch may be stopped and the cooling begun.

The scum or soap is then skimmed off and acidulated, whereupon, after settling, there is a separation of the mass into two layers, the upper of which contains crude tall oil, which is removed. This tall oil consists essentially of a mixture of fatty acids of the oleic, linoleic, and linolenic series with colophonic or rosin acids, such as abietic acid, each being somewhat more than 40% of the total. There is also about 10 to 15% of inert unsaponifiable matter of non-acidic character, of which phytostearin is probably the most important but is present to the extent of only about 3%. The relative proportions of the three main groups of constituents in tall oil, viz., rosin acids, fatty acids, and inerts, will vary with the kind of wood used, the pulping process, and the season of logging, but, generally speaking, about 45% rosin acids, about 45% fatty acids, and about 10% of unsaponifiable inerts is a fairly representative average analysis.

The tall oil may or may not be refined by any of the methods known to the art. If refining is to be employed, it is preferred to use the method disclosed by H. L. Blengsli in United States Patent No. 2,111,259.

Many efforts have been made to use tall oil, with or without first refining it, in commerce and industry so as to utilize this very important by-product of the paper and pulp industry in an economical manner. Such efforts have never met with great commercial success.

We have discovered a process for treating tall oil, refined or unrefined, to produce therefrom a highly valuable wax-like product, possessing in marked degree properties of commercial desirability in many and diverse industries.

It is an object of the invention to produce from tall oil a condensation product which may be simply, cheaply and practically manufactured, and may be valuable and useful commercially and industrially.

It is another object of the invention to produce a wax-like product by heating tall oil to about 150° C. to about 300° C. in the presence of a catalyst.

It is a further object of the invention to produce a thermoplastic resin as a condensation product of fatty acids and rosin acids.

The invention also contemplates a process of producing a wax-like condensation product from rosin acids and fatty acids.

Other objects and advantages of our invention will become apparent from the following description of a preferred procedure for carrying it into practice.

In carrying our invention into practice, the tall oil is heated with an appropriate catalyst and under suitable conditions to a temperature in the range of the distillation temperatures of tall oil. Our research has demonstated that tall oil may be used in a refined or in an unrefined or crude state. Although heat alone causes some condensation, it has been found that in the presence of catalysts, the rate of formation of the condensation products is greatly accelerated. In practising our invention, we have discovered that substances of acidic character make very effective catalysts. For example, mineral acids, sulfonic acids, acid salts of both mineral and sulfonic acids, and the residual acid from the preparation of fuller's earth have all given good results. Thus, sulfuric acid, sodium acid sulfate, zinc chloride, xylenesulfonic acid, sodium xylenesulfonate, etc., have been most successfully employed, the acid salts, such as zinc chloride, which is acid of itself, or sodium xylenesulfonate or sodium benzenesulfonate, etc., which react with the acids present in the tall oil to give the effect of an acid salt, being preferred. The use of alkalies gives traces of the reaction product, but alkalies are not to be considered catalysts like substances of acidic character.

It has been found that pressure is not essential but that the speed of formation of the condensation or wax-like products is increased by pressure.

In general, it has been found that a temperature within the range in which the normal tall oil is usually distilled is a convenient and highly efficient temperature at which to operate. This range is from about 150° C. to about 300° C.

Higher temperatures tend to darken the product.

Among the suitable methods for carrying out the invention, we have discovered a few which afford excellent results and which seem to meet most of the needs likely to arise. Thus, the process may be performed as a separate operation or in conjunction with a distillation or fractionation of the tall oil. For example, the catalyst selected may be added to the tall oil and the whole then heated under reflux until the desired wax-like condensation product is obtained. In this manner the greatest possible amount of tall oil consistent with economy is converted into the reaction product, and that part which is left unconverted (mostly fatty acids, as hereinafter explained), may then be distilled off, leaving a residual waxy product which is recovered.

An alternative method is to add the catalyst to the tall oil and to distill or fractionate off the fatty acids and rosin acids immediately. In this case, the condensation occurs at the same time that part of the reacting materials leave the vessel. When the distillation is complete, the residual wax-like product is removed.

Another method is partially to distill or fractionate the tall oil in any suitable manner and thereafter to add the catalyst to the residual fractions and continue the heating until said residue is converted into the wax-like condensation product.

It is obvious that the quality of the condensation product, as well as the quantity, will vary with the method selected. For instance, the higher the proportion of lower boiling constituents left in the reaction vessel to be condensed into the wax-like product, the lighter the color, the better the odor, and the higher the quality of the product. Then, again, if refined tall oil, such as produced by the method disclosed in the aforesaid Blengsli U. S. Patent No. 2,111,259 is used as the starting material, the product made therefrom will be of particularly fine quality, light colored, and nearly odorless.

As the wax-like product does not distill over but remains in the vessel, solidifying upon cooling, it will carry with it any coloring matter present in the starting material. Care is to be taken if lighter products are to be produced, as the more color in the raw material, the darker will be the product. We have found that the product may be decolorized by treating it in a molten state with adsorbent carbon. Another method of purification is to dissolve the wax in a suitable organic solvent, then treat this solution with adsorbent carbon, filter, and subsequently distill off the solvent. Other appropriate means of decolorizing or purifying the wax, or the tall oil before beginning, may be employed as those skilled in the art will readily understand.

The wax-like product resulting from our catalytic heat treatment of tall oil is a condensation product of somewhat variable composition, depending upon the original starting material and our treatment thereof, but in general its composition is one resulting from the condensation of approximately two parts of rosin acids to one part of fatty acids. Since, our wax-like product does not distill over, the non-acidic inerts in the original tall oil will (unless removed by purification beforehand) also be present in the resulting condensation product. This condensation product has physical and chemical characteristics similar to wax, such as beeswax or paraffin, and, in general, is neither sticky nor tacky. It has a light amber color varying as described heretofore with composition of raw or starting material and subsequent treatment. As mentioned hereinabove in connection with its purification, our product is soluble in the ordinary organic solvents.

We have found that our wax-like material may be successfully used as a wax in many important connections. It may be employed in wax emulsions, leather dressings, in paper impregnation and sizing, in printing inks, and is useful as a softening agent or as a plasticizer.

For the purpose of giving those skilled in the art a better understanding of carrying the invention into practice, the following illustrative examples are given:

Example No. I

Tall oil is heated with about 0.1% of its weight of sulfuric acid to between about 150 and about 300° C. for about two hours under reflux conditions and then the unchanged constituents (say about 50% of the organic acids ariginally present) are removed by distilling under a vacuum of less than 10 mm. The wax-like residue is melted, washed first with water and then with a weak sodium bicarbonate solution to remove the catalyst acid. On chilling, the desired wax product is obtained, which may be decolorized if desired by treating the molten wax with adsorbent carbon.

Example No. II

Our wax-like condensation product may likewise be produced by using small amounts of zinc chloride as the catalyst instead of the sulfuric acid. In all other respects the operations described in Example No. I are to be followed.

Example No. III

Tall oil is heated with about 0.25% of its weight of sodium benzenesulfonate at between about 150 and about 300° C., whereby the constituents of tall oil are permitted to distill over simultaneously with the occurrence of the condensation. In this case the acid in the tall oil reacts with the sodium benzenesulfonate to release benzenesulfonic acid which acts as the catalyst. The wax-like residue is melted, washed first with water and then with a weak sodium bicarbonate solution to remove the catalyst acid. On chilling, the desired wax product is obtained, which may be decolorized if desired by treating the molten wax with adsorbent carbon.

Although the invention has been described in connection with a preferred embodiment, it will be observed that variations may be resorted to and are within the purview of the appended claims. For example, it is not necessary to use tall oil as a starting material in obtaining the wax-like condensation product. One may substitute for the tall oil mixtures of abietic acid, or rosin, and unsaturated fatty acids, such as oleic acid or linoleic acid, and by using the present method a satisfactory wax-like material is produced.

We claim:

1. The process of producing a wax-like condensation product of unsaturated fatty acids and rosin acids which comprises heating tall oil with an acidic catalyst selected from the group consisting of mineral acids, sulfonic acids, and acid salts of mineral acids and sulfonic acids at a temperature within the distillation range of tall oil, and removing by distillation the unchanged organic acids whereby a wax is produced.

2. The process of producing a waxy material which comprises heating tall oil with an acidic catalyst selected from the group consisting of mineral acids, sulfonic acids, and acid salts of mineral acids and sulfonic acids under reflux conditions at a temperature of about 150° C. to about 300° C., thereafter distilling off unchanged organic acids, and neutralizing the residue whereby a waxy material is produced.

3. The process of producing a wax-like condensation product which comprises heating tall oil with an acidic catalyst selected from the group consisting of mineral acids, sulfonic acids, and acid salts of mineral acids and sulfonic acids under reflux conditions at a temperature of about 150° C. to about 300° C. for approximately two hours, thereafter distilling off unchanged organic acids, and neutralizing the residue whereby a waxy material is produced.

4. The process as set forth in claim 1 wherein the catalyst employed is a mineral acid.

5. The process as set forth in claim 1 wherein the catalyst employed is sulfuric acid and wherein it is added to the tall oil in an amount approximately equal to 0.1% by weight of the tall oil.

6. The process of producing a wax-like condensation product of unsaturated fatty acids and rosin acids which comprises heating tall oil with a small amount of zinc chloride at a temperature within the distillation range of tall oil, and removing by distillation the unchanged organic acids whereby a wax is produced.

7. The process of producing a wax-like condensation product of unsaturated fatty acids and rosin acids which comprises heating tall oil with an aromatic sulfonic acid of the benzene series at a temperature within the distillation range of tall oil, and removing by distillation the unchanged organic acids whereby a wax is produced.

RALPH H. McKEE.
HELMER L. BLENGSLI.